(12) United States Patent
Yamamori et al.

(10) Patent No.: US 6,538,100 B2
(45) Date of Patent: Mar. 25, 2003

(54) METHOD FOR PRODUCING POLYIMIDE RESIN

(75) Inventors: Yoshiyuki Yamamori, Tokyo (JP); Hiroyuki Yasuda, Tokyo (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 09/504,107

(22) Filed: Feb. 14, 2000

(65) Prior Publication Data

US 2002/0120095 A1 Aug. 29, 2002

(30) Foreign Application Priority Data

Feb. 15, 1999 (JP) .............................. 11-036399

(51) Int. Cl.[7] .................. C08G 69/26; C08G 73/10; C08G 69/28
(52) U.S. Cl. .................. 528/353; 528/10; 528/26; 528/28; 528/33; 528/38; 528/125; 528/128; 528/171; 528/172; 528/173; 528/174; 528/176; 528/183; 528/185; 528/188; 528/220; 528/229; 528/350
(58) Field of Search .................. 528/10, 26, 28, 528/125, 33, 128, 38, 171, 172, 173, 174, 176, 220, 229, 353, 183, 185, 188, 350

(56) References Cited

U.S. PATENT DOCUMENTS

| | | | | |
|---|---|---|---|---|
| 3,624,050 A | | 11/1971 | Strickrodt et al. | |
| 3,923,953 A | * | 12/1975 | Scott et al. | 264/331 |
| 4,221,897 A | * | 9/1980 | Takekoshi | 528/179 |
| 4,330,666 A | * | 5/1982 | White et al. | 528/173 |
| 4,681,928 A | * | 7/1987 | Berger et al. | 528/353 |
| 4,684,714 A | * | 8/1987 | Lubowitz et al. | 528/353 |

FOREIGN PATENT DOCUMENTS

GB 1279221 6/1972

OTHER PUBLICATIONS

Patent Abstracts of Japan, vol. 1998, No. 3 for Publication No. 09286859, published Apr. 11, 1997.

* cited by examiner

Primary Examiner—P. Hampton-Hightower
(74) Attorney, Agent, or Firm—Smith, Gambrell & Russell, LLP

(57) ABSTRACT

The object of the present invention is to provide a method capable of producing polyimide resins having excellent heat resistance, which can utilize inexpensive monomers and does not use solvents. The method comprises mixing, in the absence of a solvent, a diamine and at least one tetracarboxylic acid component selected from the group consisting of a tetracarboxylic acid, a tetracarboxylic acid monoanhydride and a tetracarboxylic acid dianhydride capable of forming two imide rings upon cyclization, and then heat-treating the mixture.

5 Claims, No Drawings

METHOD FOR PRODUCING POLYIMIDE RESIN

INTRODUCTION AND BACKGROUND

The present invention relates to a novel method for producing polyimide resins applicable to heat resistant films, heat resistant molded articles, adhesives, etc. without using solvents.

Polyimide resins have hitherto been obtained by reacting a tetracarboxylic acid dianhydride with a diamine in an organic solvent to produce a polyamic acid solution, and further cyclizing it by heating or chemically. According to this method, organic solvents of high polarity in which the polyamic acid is soluble must generally be used. However, most of them are expensive and harmful, and, besides, many production steps are needed. Furthermore, the tetracarboxylic acid dianhydride used contains impurities subjected to ring opening upon reacting with water or reacts with water in the air before use to undergo ring opening to produce the corresponding tetracarboxylic acid and the monohydride thereof and lose reactivity. Therefore, tetracarboxylic acid dianhydrides of high purity must be procured, and purity must be maintained for protecting from influence of water. Similarly, many of the reaction solvents readily absorb water in the air to cause deterioration in reactivity of the tetracarboxylic acid dianhydrides during the reaction. Thus, expensive organic solvents of high purity must be procured and absorption of water must be inhibited.

As a result of intensive research in an attempt to solve the problems in the conventional method for synthesis of polyimide resins which has been performed through production of polyamic acids using organic solvents, the present invention has been accomplished. The object of the present invention is to provide a synthesis method according to which polyimide resins excellent in heat resistance and mechanical strength can be obtained easily by use of inexpensive starting materials.

SUMMARY OF THE INVENTION

That is, the present invention is a method for producing polyimide resins which comprises mixing a diamine and at least one tetracarboxylic acid component selected from the group consisting of a tetracarboxylic acid, a tetracarboxylic acid monoanhydride and a tetracarboxylic acid dianhydride capable of forming two imide rings upon cyclization without using solvents, and then heat-treating the mixture.

DETAILED DESCRIPTION OF INVENTION

As the tetracarboxylic acid dianhydride used in the present invention, there may be used, for example, aromatic tetracarboxylic acid dianhydrides such as pyromellitic acid dianhydride, biphenyltetracarboxylic acid dianhydride, benzophenonetetracarboxylic acid dianhydride, oxydiphthalic acid dianhydride and 4,4'-(hexafluoroisopropylidene) diphthalic acid dianhydride, and aliphatic tetracarboxylic acid dianhydrides such as cyclobutanetetracarboxylic acid dianhydride and cyclopentanetetracarboxylic acid dianhydride. The tetracarboxylic acid dianhydrides used in the present invention are not limited to these examples. They can be used each alone or in combination of two or more.

The tetracarboxylic acids and tetracarboxylic acid monoanhydrides capable of forming two imide rings upon cyclization are obtained by reacting the above tetracarboxylic acid dianhydrides with water to cause ring opening. They may be derived from either aromatic tetracarboxylic acid dianhydrides or aliphatic tetracarboxylic acid dianhydries.

This means that in the present invention the tetracarboxylic acid dianhydrides may contain, as impurities, partly ring-opened monoanhydrides or tetracarboxylic acids. Moreover, these may be positively added to the tetracarboxylic acid dianhydrides. In the conventional solution reaction using a polyamic acid as an intermediate product, unless tetracarboxylic acid dianhydrides of high purity in polyimide grade are used, reaction rate decreases and sufficient characteristics of cured products cannot be obtained. On the other hand, according to the present invention, inexpensive tetracarboxylic acid dianhydrides of low purity can also be used.

As diamines used in the present invention, mention may be made of, for example, 4,6-dimethyl-m-phenylenediamine, 2,5-dimethyl-p-phenylenediamine, 2,4-diaminomesitylene, 4,4'-methylenedi-o-toluidine, 4,4'-methylenedi-2,6-xylidine, 4,4'-methylene-2,6-diethylaniline, 2,4-toluenediamine, m-phenylenediamine, p-phenylenediamine, 4,4'-diaminodiphenylpropane, 3,3'-diaminodipenylpropane, 4,4'-diaminodiphenylethane, 3,3'-diaminodiphenylethane, 4,4'-diaminodiphenylmethane, 3,3'-diaminodiphenylmethane, 4,4'-diaminodiphenyl sulfide, 3,3'-diaminodiphenyl sulfide, 4,4'-diaminodiphenyl sulfone, 3,3'-diaminodiphenyl sulfone, 4,4'-diaminodiphenyl ether, 3,3'-diaminodiphenyl ether, benzidine, 3,3'-diaminobiphenyl, 3,3'-dimethyl-4,4'-diaminobiphenyl, 3,3'-dimethoxybenzidine, bis(p-aminocyclohexyl)methane, bis (p-β-amino-t-butylphenyl) ether, bis(p-β-methyl-δ-aminopentyl)benzene, p-bis(2-methyl-4-aminopentyl) benzene, 1,5-diaminonaphthalene, 2,6-diaminonaphthalene, 2,4-bis(β-amino-t-butyl)toluene, 2,4-diaminotoluene, m-xylene-2,5-diamine, p-xylene-2,5-diamine, m-xylylenediamine, p-xylylenediamine, 2,6-diaminopyridine, 2,5-diaminopyridine, 2,5-diamino-1,3,4-oxadiazole, 1,4-diaminocyclohexane, piperazine, methylenediamine, ethylenediamine, tetramethylenediamine, pentamethylenediamine, hexamethylenediamine, 2,5-dimethylhexamethylenediamine, 3-methoxyhexamethylenediamine, heptamethylenediamine, 2,5-dimethylheptamethylenediamine, 3-methylheptamethylenediamine, 4,4-dimethylheptamethylenediamine, octamethylenediamine, nonamethylenediamine, 5-methylnonamethylenediamine, decamethylenediamine, 1,3-bis(3-aminophenoxy)benzene, 2,2-bis[4-(4-aminophenoxy)phenyl]propane, 1,3-bis(4-aminophenoxy)benzene, bis-4-(4-aminophenoxy)phenyl sulfone, bis-4-(3-aminophenoxy)phenyl sulfone, 9,9'-bis(4-aminophenyl)fluorene, and 2,2-bis(4-aminophenyl) hexafluoropropane, or siloxanediamines such as α,ω-bis(3-aminopropyl)polydimethylsiloxane. These diamines can be used each alone or in combination of two or more.

In addition to the diamine and at least one tetracarboxylic acid component selected from the group consisting of a tetracarboxylic acid, a tetracarboxylic acid monoanhydride and a tetracarboxylic acid dianhydride, capable of forming two imide rings upon cyclization, there may be added a dicarboxylic acid and a dicarboxylic acid anhydride such as phthalic acid and phthalic anhydride or a monoamine such as aniline in a small amount for the purpose of controlling the molecular weight and maintaining processability. Furthermore, as far as performances are not damaged, various additives such as a filler can be simultaneously added.

The synthesis of polyimide resins according to the present invention is carried out by mixing the above tetracarboxylic acid component and the above diamine at a molar ratio of 0.8–1.2:1, and heating and reacting the components at 80–450° C. without adding a solvent to the mixture, namely, in the solventless state, to form an imide compound. The tetracarboxylic acid component and the diamine used in this invention are generally solid, and a solid mixture is obtained by mixing them as they are. There are liquid monomers such as a siliconediamine, but when these are mixed in liquid state with the solid tetracarboxylic acid component without adding solvents, solid mixtures are also obtained.

The method for mixing the tetracarboxylic acid component with the diamine in the present invention is not limited as far as the solids can be uniformly mixed, and it is preferred to mix them as uniformly as possible using a mortar or a high speed stirring mixer provided with a heating means. The heat-treating temperature is generally 80–450° C. during a heating time of 1 minute to 30 hours, but it is necessary to determine an optimum temperature in accordance with proceeding of the reaction depending on a combination of the monomers. For example, the temperature can be gradually raised from a low temperature, or the temperature can be raised stepwise in such a manner as 80° C./30 minutes+130° C./1 hour+200° C./1 hour. If the heating temperature is too low (generally, lower than 80° C.), the reaction rate abruptly decreases to leave unreacted substances, and resins of high molecular weight cannot be obtained. If the heat treatment is carried out at a temperature higher than the heat decomposition temperature of the polymer, undesirable side reactions such as heat deterioration and crosslinking take place to often damage the subsequent processability or properties of the resin.

The polyimide resin thus obtained can be ground and used for molding as it is, and when the polyimide resin is soluble in a solvent, the resin is dissolved in the solvent to prepare a resin varnish and this can be used in the same manner as in the conventional polyimide resin varnishes.

The present invention will be explained in more detail by the following examples. These examples should not be construed as limiting the invention in any manner.

Methods and conditions for measurement of various properties of the polyimide resins obtained by the present invention are as follows.

(1) Molecular weight distribution:

Using a gel permeation chromatography (GPC) device (a high performance liquid chromatogram manufactured by Waters Co., Ltd. to which is connected a polystyrene column GL-S300MDT-5 manufactured by Hitachi Chemical Co., Ltd.) with tetrahydrofuran/N,N-dimethylformamide/phosphoric acid(100/100/1 in weight ratio) as a mobile phase, an absorbance for 270 nm was measured by Model 484 absorbance meter manufactured by Waters Co., Ltd., from which molecular weight and molecular weight distribution (in terms of polystyrene) were calculated.

(2) Glass transition temperature and melting point:

These were measured using a differential scanning calorimeter (DSC220C manufactured by Seiko Denshi Kogyo Co., Ltd.) under the conditions of a heating rate of 10° C./min and a temperature range of 30–500° C.

EXAMPLE 1

32.2 Grams (0.1 mol) of 3,3',4,4'-benzophenonetetracarboxylic acid dianhydride powder and 21.2 g (0.1 mol) of 3,3'-diaminobenzophenone powder were uniformly mixed by stirring in a mortar for 5 minutes to obtain a solid mixture. This solid mixture was uniformly spread all over a tray and heat-treated at 200° C. for 1 hour to obtain a polyimide resin powder.

The resulting polyimide resin powder had a glass transition temperature of 252° C., a melting point of 300° C., and a weight-average molecular weight of 50000 in terms of polystyrene. The weight decreased by 6.7% after the heat treatment, and this suggests that the monomers in nearly equal molar amount reacted with each other (caused dehydration condensation reaction) in theoretical manner. The resulting polyimide resin powder was ground to 1 mm or smaller in particle size by a grinder, and molded by an injection molding machine at a molding temperature of 380° C. and a mold temperature of 150° C. to obtain a satisfactory polyimide molded product.

EXAMPLE 2

A polyimide resin powder was obtained in the same manner as in Example 1, except that 34.0 g (0.1 mol) of 3,3',4,4'-benzophenonetetracarboxylic acid monoanhydride was used in place of 32.2 g (0.1 mol) of 3,3',4,4'-benzophenonetetracarboxylic acid dianhydride powder.

The resulting polyimide resin powder had a glass transition temperature of 250° C., a melting point of 297° C., and a weight-average molecular weight of 42000 in terms of polystyrene. The weight decreased by 9.7% after the heat treatment, and this suggests that the monomers in nearly equal molar amount reacted with each other (caused dehydration condensation reaction) in theoretical manner. The resulting polyimide resin powder was ground to 1 mm or smaller in particle size by a grinder, and molded by an injection molding machine at a molding temperature of 380° C. and a mold temperature of 150° C. to obtain a satisfactory polyimide molded product.

EXAMPLE 3

A polyimide resin powder was obtained in the same manner as in Example 1, except that 35.8 g (0.1 mol) of 3,3',4,4'-benzophenonetetracarboxylic acid was used in place of 32.2 g (0.1 mol) of 3,3',4,4'-benzophenonetetracarboxylic acid dianhydride powder.

The resulting polyimide resin powder had a glass transition temperature of 248° C., a melting point of 296° C., and a weight-average molecular weight of 38000 in terms of polystyrene. The weight decreased by 12.3% after the heat treatment, and this suggests that the monomers in nearly equal molar amount reacted with each other (caused dehydration condensation reaction) in theoretical manner. The resulting polyimide resin powder was ground to 1 mm or smaller in particle size by a grinder, and molded by an injection molding machine at a molding temperature of 380° C. and a mold temperature of 150° C. to obtain a satisfactory polyimide molded product.

EXAMPLE 4

A polyimide resin powder was obtained in the same manner as in Example 1, except that a mixture of three benzophenonetetracarboxylic acid components (3.4 g (0.01 mol) of 3,3',4,4'-benzophenonetetracarboxylic acid monoanhydride, 3.6 g (0.01 mol) of 3,3',4,4'-benzophenonetetracarboxylic acid and 25.8 g (0.08 mol) of 3,3',4,4'-benzophenonetetracarboxylic acid dianhydride powder) was used in place of 32.2 g (0.1 mol) of 3,3',4,4'-benzophenonetetracarboxylic acid dianhydride powder.

The resulting polyimide resin powder had a glass transition temperature of 250° C., a melting point of 298° C., and a weight-average molecular weight of 46000 in terms of polystyrene. The weight decreased by 7.6% after the heat treatment, and this suggests that the monomers in nearly equal molar amount reacted with each other (caused dehydration condensation reaction) in theoretical manner. The resulting polyimide resin powder was ground to 1 mm or smaller in particle size by a grinder, and molded by an injection molding machine at a molding temperature of 380° C. and a mold temperature of 150° C. to obtain a satisfactory polyimide molded product.

EXAMPLE 5

32.2 Grams (0.1 mol) of 3,3',4,4'-benzophenonetetracarboxylic acid dianhydride powder and two diamines (10.6 g (0.05 mol) of 3,3'-diaminobenzophenone powder and 12.5 g (0.05 mol) of α,ω-bis(3-aminopropyl)dimethyldisiloxane) were successively added and mixed in a mortar to obtain a solid mixture. The α,ω-bis(3-aminopropyl)dimethyldisiloxane used here was liquid in the state of monomer, but rapidly became a solid mixture by the mixing in the mortar. Thereafter, a polyimide resin powder was obtained in the same manner as in Example 1.

The resulting polyimide resin powder had a glass transition temperature of 220° C., a melting point of 268° C., and a weight-average molecular weight of 42000 in terms of polystyrene. The weight decreased by 7.3% after the heat treatment, and this suggests that the monomers in nearly equal molar amount reacted with each other (caused dehydration condensation reaction) in theoretical manner. 350 Parts by weight of N-methyl-2-pyrrolidone was added to 150 parts by weight of the resulting polyimide resin powder to prepare a polyimide resin solution of 30% by weight in resin concentration. This resin solution was coated on a release surface of a stainless steel foil (50 μm thick) subjected to releasing treatment by a die coater so as to give a dry thickness of 25 μm, followed by subjecting the coat to successive heat treatments of 100° C./3 minutes, 150° C./3 minutes and 200° C./3 minutes. Then, the dry coat film was peeled off from the stainless steel foil to obtain a polyimide resin film. The resulting polyimide resin film was a film high in flexibility and excellent in characteristics.

EXAMPLE 6

33.4 Grams (0.1 mol) of 2,2-bis(4-aminophenyl) hexafluoropropane was successively added to 44.4 g (0.1 mol) of 4,4'-(hexafluoroisopropylidene)diphthalic acid anhydride and these were mixed in a mortar to obtain a solid mixture. Thereafter, a polyimide resin powder was obtained in the same manner as in Example 1.

The resulting polyimide resin powder had a glass transition temperature of 322° C., a melting point of 366° C., and a weight-average molecular weight of 43000 in terms of polystyrene. The weight decreased by 4.6% after the heat treatment, and this suggests that the monomers in nearly equal molar amount reacted with each other (caused dehydration condensation reaction) in theoretical manner. 400 Parts by weight of N-methyl-2-pyrrolidone was added to 100 parts by weight of the resulting polyimide resin powder to prepare a polyimide resin solution of 20% by weight in resin concentration. This resin solution was coated on a release surface of a stainless steel foil (50 μm thick) subjected to releasing treatment by a die coater so as to give a dry thickness of 25 μm, followed by subjecting the coat to successive heat treatments of 100° C./3 minutes, 150° C./3 minutes and 200° C./3 minutes. Then, the dry coat film was peeled off from the stainless steel foil. Furthermore, the edge faces of the film was fixed by a frame, followed by subjecting to heat treatments of 250° C./3 minutes, 300° C./3 minutes and 350° C./10 minutes to obtain a polyimide resin film. The resulting polyimide film was a film high in flexibility and transparency, and excellent in characteristics.

Comparative Example 1

206 Grams of dried and purified N-methyl-2-pyrrolidone was charged in a four-necked flask equipped with a dry nitrogen gas introducing pipe, a condenser, a thermometer and a stirrer, and 21.2 g (0.1 mol) of 3,3'-diaminobenzophenone powder was introduced therein under stirring while flowing nitrogen gas therethrough, followed by stirring until the system became homogeneous. After the homogeneous dissolution, under keeping the system at 20° C., the same mixture of the three benzophenonetetracarboxylic acid components as used in Example 4 (3.4 g (0.01 mol) of 3,3',4,4'-benzophenonetetracarboxylic acid monoanhydride, 3.6 g (0.01 mol) of 3,3',4,4'-benzophenonetetracarboxylic acid and 25.8 g (0.08 mol) of 3,3',4,4'-benzophenonetetracarboxylic acid dianhydride) was successively introduced into the flask, followed by continuing the stirring for 8 hours. During this stirring, the flask was kept at 20° C. Thereafter, the nitrogen gas introducing pipe and the condenser were removed, and a Dean-Stark tube filled with toluene was fitted to the flask and 100 g of toluene was added to the system. The system was heated to 175° C. by using an oil bath, and the water produced was removed from the system. After heating for 6 hours, production of water was not recognized. The system was cooled to obtain a polyimide resin solution.

The resin had a weight-average molecular weight of 8000. In the same manner as in Example 5, the resulting resin solution was coated on a release surface of a stainless steel foil (50 μm thick) subjected to releasing treatment by a die coater so as to give a dry thickness of 25 μm, followed by subjecting the coat to successive heat treatments of 100° C./3 minutes, 150° C./3 minutes and 200° C./3 minutes. Then, it was attempted to peel off the dry coat film from the stainless steel foil, but probably owing to the low molecular weight, the film was fragile and broken, and any polyimide resin film could not be obtained.

According to the method of the present invention, not only tetracarboxylic acid dianhydrides of high purity, but also ring-opened tetracarboxylic acids or tetracarboxylic acid monoanhydrides contained as impurities in the tetracarboxylic acid dianhydrides can be used as starting monomers. Moreover, polyimide resins can be easily obtained through a very simple process without using expensive and harmful organic polar solvents which are difficult to handle. Therefore, the method of the present invention is an excellent and industrially suitable method for producing polyimide resins as compared with conventional methods for producing polyimide resins using solvents through production of polyamic acids.

What is claimed is:

1. A method for producing a polyimide resin, said method comprising:

forming a mixture by mixing in the absence of a solvent
      i) at least one diamine component indispensably containing a siloxanediamine, and
      ii) at least one tetracarboxylic acid component selected from the group consisting of:

a) tetracarboxylic acid,
b) tetracarboxylic acid monoanhydride, and
c) tetracarboxylic acid dianhydride, heat-treating the mixture at a sufficient temperature to form said polyimide resin;

wherein said tetracarboxylic acid component is capable of forming two imide rings upon cyclization.

2. A method for producing a polyimide resin according to claim 1, wherein said mixture of the tetracarboxylic acid component and the diamine component has a molar ratio of 0.8–1.2:1, and said method further comprises:

heating said mixture at a temperature of 80–450° C. to react said tetracarboxylic acid component and said diamine component to form said polyimide resin.

3. A method for producing a polyimide resin consisting essentially of the following steps:

forming a mixture of a siloxanediamine and a tetracarboxylic acid component that is capable of forming two imide rings upon cyclization; and heat treating the mixture;

wherein the mixture is formed in the absence of a solvent.

4. The method of claim 3 further comprising the following step:

adding dicarboxylic acid, a dicarboxylic acid anhydride, or a monoamine to the mixture prior to the heat treating.

5. A polyimide resin formed by the method of claim 3.

* * * * *